United States Patent [19]

McDonald

[11] 4,403,076

[45] Sep. 6, 1983

[54] FAST CURING NOVOLAC RESIN AND SHELL MOLDING COMPOSITION AND METHODS FOR PRODUCING THE SAME

[75] Inventor: Roderick A. McDonald, Bothell, Wash.

[73] Assignee: Pacific Resins & Chemicals, Inc., Tacoma, Wash.

[21] Appl. No.: 355,239

[22] Filed: Mar. 5, 1982

Related U.S. Application Data

[60] Division of Ser. No. 168,622, Jul. 14, 1980, which is a division of Ser. No. 43,051, May 29, 1979, abandoned, which is a continuation-in-part of Ser. No. 892,412, Mar. 31, 1978, abandoned.

[51] Int. Cl.$^3$ .......................... C08G 8/10; C08L 61/10
[52] U.S. Cl. .................................. 525/501; 427/221; 428/404; 523/145; 528/139; 528/140; 528/165; 528/137; 528/141; 528/143; 528/144
[58] Field of Search ............... 528/137, 139, 143, 140, 528/144, 165, 141; 525/501; 523/145

[56] References Cited

U.S. PATENT DOCUMENTS

| | | |
|---|---|---|
| 25,661 | 10/1924 | Less et al. . |
| 2,475,587 | 7/1949 | Bender et al. .................. 528/165 X |
| 2,606,889 | 8/1952 | Ward et al. . |
| 2,856,381 | 10/1958 | McNaughtan et al. ............. 525/501 |
| 2,885,386 | 5/1959 | Straka et al. ........................ 528/140 |
| 2,955,336 | 10/1960 | Horn et al. . |
| 2,970,121 | 1/1961 | Schmittberger . |
| 2,990,594 | 7/1961 | Lewis . |
| 2,991,267 | 7/1961 | Bean . |
| 3,006,893 | 10/1961 | West et al. . |
| 3,332,911 | 7/1967 | Huck ............................. 528/139 X |
| 3,409,571 | 11/1968 | Shepard et al. . |
| 3,425,989 | 2/1969 | Shepard et al. . |
| 3,476,707 | 11/1969 | Culbertson et al. . |
| 3,487,045 | 12/1969 | Shepard et al. ..................... 525/503 |
| 3,944,514 | 3/1976 | Nishiyama et al. . |
| 4,020,035 | 4/1977 | Edwards et al. . |
| 4,097,463 | 6/1978 | Culbertson ..................... 528/140 X |
| 4,113,700 | 9/1978 | Culbertson ..................... 528/140 X |

FOREIGN PATENT DOCUMENTS

| | | |
|---|---|---|
| 45-2188 | 1/1970 | Japan . |
| 1077292 | 6/1967 | United Kingdom . |
| 1094590 | 12/1967 | United Kingdom . |
| 1114004 | 5/1968 | United Kingdom . |

OTHER PUBLICATIONS

"Shell Cores," Dietert, Harry W., Foundry Core Practice, pp. 207-216 and 232, published by American Foundrymen's Society, 1966.

J. Appl. Chem., Dec. 1957, Fraser et al., pp. 676-700, vol. 7.

Am. Chem. Soc. Preprints, 1967, pp. 115-124, Partansky.

*Primary Examiner*—Howard E. Schain
*Attorney, Agent, or Firm*—Christensen, O'Connor, Johnson & Kindness

[57] ABSTRACT

A fast curing shell molding composition having the tensile strength of a conventional novolac resin when cured contains a fast curing novolac resin comprising a methylene chained polyphenylol wherein a major portion of the methylene linkages are coupled to adjacent phenylol groups at the o-o' and p-p' position, wherein at least about 19% of the methylene linkages are coupled to adjacent phenylol groups at the o-o' portions, and wherein at least about 3% of the total number of methylene linkages are coupled to adjacent phenylol groups at the p-p' positions. The shell molding composition is produced from the fast curing novolac resin by uniformly coating refractory granules with the fast curing resin. The fast curing novolac resin can be prepared by blending a conventional novolac resin with a novolac resin having a large proportion of methylene linkages coupled to adjacent phenylol groups at the o-o' position. The fast curing novolac resin can also be prepared by a novel two step condensation reaction of phenol and formaldehyde.

16 Claims, No Drawings

FAST CURING NOVOLAC RESIN AND SHELL MOLDING COMPOSITION AND METHODS FOR PRODUCING THE SAME

This is a divisional of application Ser. No. 168,622, filed July 14, 1980, which in turn is a divisional of application Ser. No. 043,051, filed on May 29, 1979, now abandoned, which in turn is a cont.-in-part of application Ser. No. 892,412, filed on Mar. 31, 1978, now abandoned, the benefit of the filing dates of which are hereby claimed under 35 USC 120.

BACKGROUND OF THE INVENTION

The present invention relates to novolac resins, and more particularly to fast curing novolac resins and shell molding compositions used in the production of foundry shell cores and molds.

Foundries today use resin-coated refractory granules such as sand to form shell molds and cores used for casting metal and other materials. Typically, a minor proportion of resin and hardening agent are combined with a clean, dry sand and mulled until the resin is uniformly dispersed over each grain of sand. The resin-coated sand, or shell molding composition, is then stored for use in the production of shell molds and cores.

Novolac resins have found high acceptability in the production of shell molding compositions for making shell molds and cores. Conventionally, an acid-catalyzed phenol-formaldehyde novolac resin is employed to coat the sand. Prior to coating, an accelerator such as hexamethylenetetramine (hereinafter "hexa") is mixed with the novolac resin to function as a catalyst and source of additional formaldehyde to cross link the novolac resin. Such conventional novolac resins are methylene chained polyphenylols in which the methylene linkages are attached at the o-o', o-p' and p-p' positions to the adjacent phenylol groups. A typical distribution of the methylene linkage attachment locations to the adjacent phenylol groups are about 10% o-o', 45% p-p' and 45% o-p', based on the total number of methylene linkages present in the resin. The distribution of the attachment locations of the o-o' linkages may vary in the conventional acid-catalyzed novolac resins by no more than four percent from the foregoing percentages, while the p-p' and o-p' percentages may vary slightly more.

Conventional shell molding compositions produced from such conventional novolac resins function as an excellent binder for sand in the production of shell molds and cores. Conventional shell molding compositions, however, exhibit a relatively long cure time, i.e., slow cure speed, resulting in a relatively long residence time for the curing mold or core in the machines that produce the molds and cores. For some time, the industry that supplies resin for shell molding compositions has searched for a faster curing resin suitable for use in shell molding compositions. For example, accelerators for the reaction between hexa and the novolac resins have been investigated. The use of accelerators such as ammonium salts of carboxylic acids, resorcinol, orcinol, phloroglucinol and thiourea has resulted in a cure speed increase; however, the tensile strength and melt points of the resulting cured shell mold or core are reduced to unacceptable levels when such accelerators are present.

It is known that novolac resins containing a high proportion of o-o' methylene linkages are fast curing plastic molding compounds. See for example Bender et al., U.S. Pat. No. 2,475,587, and Frazier et al., J.Appl.-Chem. 7, December 1957, "Preparation of 'High Ortho' Novolac Resins I, Metal Ion Catalysis and Orientation Effect," page 676, and "Preparation of High Ortho Novolac Resins II, The Course of the Reaction," id, page 689. The use of such resins containing a large proportion of o-o' methylene linkages (hereinafter "high ortho resins") has been suggested as a substitute for conventional novolac resins to increase the cure speed of shell molding compositions. Although the high ortho resins, when substituted for conventional resins, do increase the cure speed of shell molding compositions, a detrimental reduction in the tensile strength of the resulting mold or core is exhibited. Thus high ortho novolac resins have not gained wide acceptance in the shell molding industry as a substitute for the slower curing, conventional resins.

Accordingly, it is a broad object of the present invention to provide a novolac resin and a shell molding composition produced from the resin that has a cure speed greater than that of conventional resins and shell molding compositions. It is a further object of the present invention to provide such fast curing resins and shell molding compositions that do not produce molds and cores that exhibit a significant loss in tensile strength, but rather provide a mold or core that has a tensile strength about equal to or greater than that of the molds and cores formed from conventional shell molding compositions.

SUMMARY OF THE INVENTION

In accordance with the foregoing objects, and other objects that will become apparent to one of ordinary skill working in the art of shell molding resins and compositions, the present invention provides a fast curing novolac resin for use in coating refractory granules. The resin comprises a methylene chained polyphenylol wherein at least about 50% of the total number of methylene linkages are coupled to adjacent phenylol groups at the o-o' and p-p' positions, wherein at least about 19% of the total number of methylene linkages are coupled to adjacent phenylol groups at the o-o' position, and wherein at least about 3% of the total number of methylene linkages are coupled to adjacent phenylol groups at the p-p' position. It is preferred that the o-o' linkages in the resin constitute from about 19% to about 57%, and most preferably from about 30% to about 40%, of the total number of methylene linkages in the resin. Preferably from about 15% to about 30% of the total number of methylene linkages are coupled at the p-p' position.

In accordance with the present invention, a fast curing shall molding composition is produced by coating refractory granules, such as sand, with from about 1% by weight to about 9% by weight, and preferably from 2% to 6% by weight, of the fast curing resin, based on the combined weight of the granules and resin. The shell molding composition thus produced can be formed into a mold or core in a mold or core producing machine. The shell molding composition of the present invention will cure adequately to be removed from the machine in on the order of a 20% to 40% shorter time than that required for conventional shell molding compositions. Thus the turnaround time of the mold and core producing machines can be significantly reduced, allowing the number of molds or cores produced to be increased in a given amount of time. The molds and cores produced from the shell molding composition of the present invention do no, however, exhibit any loss in tensile strength over molds and cores produced from conventional shell molding compositions, and in certain instances exhibit a greater strength.

The fast curing resin of the present invention can be satisfactorily produced in two different ways. First, the novolac resin can be produced by physically mixing a conventional novolac resin used for shell molding compositions with a high ortho novolac resin. The synergistic increase in cure speed without a loss of tensile strength is quite unexpected since one of ordinary skill in the art would expect only additive properties to result from the mixture of a conventional and a high ortho resin. To the contrary, however, the resulting shell molding composition of the present invention exhibits substantially the same tensile strength as conventional shell molding compositions while exhibiting the cure speed of shell molding compositions produced from high ortho resins alone.

The fast curing novolac resin of the present invention can also be produced by a novel two step condensation reaction between phenol and formaldehyde. The novel method for producing fast curing resins comprises initially reacting x moles of phenol with y moles of formaldehyde in the presence of an acid catalyst to form an intermediate resin. The pH of the intermediate resin is then adjusted to within the range of from about 3.0 to about 7.0. Thereafter, w moles of phenol and z moles of formaldehyde are reacted in the presence of the intermediate resin and an ortho-directing catalyst. In the two step condensation reaction, $x>y$, $w>z$, and $(w+x)>(y+z)$. The sum of the o-o' and p-p' methylene linkages in the resulting hybrid resin will be at least about 50% of the total number of methylene linkages. Moreover, at least 15% of the methylene linkages in the resulting resin will be o-o' and at least a minor portion of the total number of methylene linkages will be p-p'.

DETAILED DESCRIPTION OF THE INVENTION

The fast curing novolac resin of the present invention is especially suitable for use in coating refractory granules to yield a fast curing shell molding composition that has the strength of conventional shell molding compositions. The fast curing novolac resin of the present invention comprises a methylene chained substituted or unsubstituted polyphenylol. It is to be understood that when the term "methylene chained polyphenylol" is used herein, it is intended to encompass compositions having the formula

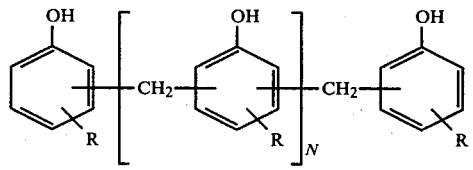

wherein N is in the range of from 0 to about 15 or more, and wherein R is selected from hydrogen, alkyl, alkenyl, and alkynyl groups having from 1 to 10 carbon atoms. The location of attachment of the methylene linkages to adjacent phenylol groups is of critical importance to the present invention. A methylene linkage attached at one end to the ortho carbon atom of an adjacent phenylol group and attached at the other end to an ortho carbon atom of a phenylol group will hereinafter be referred to as an "o-o' methylene linkage." Similarly, a methylene linkage joined to the para carbon atoms of adjacent phenylol groups will be referred to as a "p-p' methylene linkage." A methylene linkage joined at one end to an ortho carbon atom of a phenylol group and attached at the other end to the para carbon atom of a phenylol group will be referred to as an "o-p' methylene linkage". When the "phenylol" is used herein it is intended to cover unsubstituted phenylol groups as well as substituted phenylol groups as defined in the structural formula above.

It has been found that by appropriately adjusting the location of attachment of the methylene linkages to the phenylol groups as set forth below, a fast curing novolac resin is yielded that, when combined with refractory granules and cured, will produce a fast curing shell molding composition having a shorter cure time (faster cure speed) than conventional shell molding composition when cured. In accordance with the present invention, the sum of the o-o' and p-p' methylene linkages must be at least about 50% of the total number of methylene linkages in the fast curing novolac resin, at least about 19% of the total number of methylene linkages must be o-o', while at least about 3% of the total number of the methylene linkages must be p-p'. This fast curing novolac resin will provide a shell molding composition having a cure speed on the order of 10% or more faster than the cure speed of a shell molding composition containing conventional novolac resins while retaining the strength of conventional molding compositions. If the number of o-o' linkages is allowed to fall below about 19% of the total number of methylene linkages in the resin, the cure speed of the resin will quickly increase to that of a conventional resin. Preferably, about 19% to about 57% of the total number of methylene linkages are o-o'. The best combination of cure speed, cured strength, and economics are achieved when the total number of o-o' linkages falls in the range of from 30% to 40% and the total number of p-p' linkages in the resin fall within the range of from 15% to 30%. For example the best combination of cure speed and strength are achieved with a blend wherein about 38% of the total number of methylene linkages are o-o' and about 16.3% of the total number of methylene linkages are p-p'. A resin with almost the same cure speed and strength can be more economically achieved however by a resin containing about 33% o-o' methylene linkages and about 25% p-p' methylene linkages. Within limits, the total number of o-p' methylene linkages in the resin is not critical as long as the total amount o-p' methylene linkages is less than about 50%. A variation from 0 to less than about 50% of o-p' methylene linkages does not seriously detract from the fast curing, high strength characteristics of the resin. If the percentage of o-o' and p-p' linkages in a given resin resides outside the above-stated limits, the resulting resin will be unsuitable for use as a fast curing shell molding composition either because the cure time may be increased, or because the tensile strength of the resulting cured shell will be decreased. Lubricants and other conventional additives can be combined as desired with the novolac resin to form the fast curing shell molding composition of the present invention without adversely affecting its cure speed.

The fast curing novolac resin of the present invention can be produced by blending a conventional resin used to produce conventional shell molding compositions with a high ortho resin (a resin containing a large proportion of o-o′ methylene linkages, usually a minor proportion of o-p′ methylene linkages, and essentially no p-p′ methylene linkages). The fast curing novolac resin of the present invention so produced will be referred to hereinafter as the "blended" resin. The conventional resin and high ortho resin can be premixed to provide the blended resin, or can be separately added to refractory granules in a muller, or other mixing device used to coat refractory granules with a resin. Whether the blended resin is produced by premixing the conventional and high ortho resins or whether the conventional and high ortho resins are combined with the refractory granules in a muller will not detrimentally affect the fast curing and high tensile strength characteristics of the resulting shell molding composition. The high ortho resin and conventional resin can be mixed in any amount as long as the distribution of methylene linkages in the blended resin falls within the limits set forth above for the fast curing resin of the present invention. For example, the blended resin can be produced by combining a conventional resin containing about 10% o-o′, 45% p-p′ and 45% o-p′ methylene linkages with a high ortho resin containing about 60% o-o′ and 40% o-p′ methylene linkages in proportions of conventional resin to high ortho resin from 9:1 to about 4:95.

The fast curing novolac resin of the present invention can also be directly produced in a novel two step condensation reaction between phenol and formaldehyde. The fast curing resin of the present invention produced by the two step condensation reaction will hereinafter be referred to as the "hybrid" resin. The first condensation step is carried out by reacting phenol and formaldehyde in the presence of a strong acid catalyst. Preferably the hybrid resin is produced by combining phenol, formaldehyde and the acid catalyst and heating the reactants and catalyst to a temperature of from 50° C. to reflux conditions (about 100° C.). In the first condensation step of the process, the number of moles of formaldehyde present is preferably less than or equal to ½ the number of moles of phenol present. The first condensation step of the process is continued until a substantial portion, for example on the order of 99 mole percent, of the formaldehyde has reacted with the phenol to form an intermediate resin. Conventional acid catalysts found acceptable for purposes of the present invention include sulphuric acid, oxalic acid, salicylic acid, hydrochloric acid, phosphoric acid and p-toluene sulphonic acid. Other strong or weak acid catalysts known to the art for the acid-catalyzed, phenol-formaldehyde condensation reaction may also be utilized.

After a substantial portion of the formaldehyde added in the first condensation step of the process has reacted with phenol, the resulting intermediate resin is cooled. The pH of the intermediate resin is then adjusted upwardly to a pH of from 3.0 to about 7.0 and preferably to a pH of on the order of 5.0 to 6.0. The pH can be adjusted by the addition of a base, such as calcium hydroxide, in an amount effective to raise the pH to the aforementioned values. The second condensation step of the two step reaction is then initiated by addition to the intermediate resin of additional formaldehyde and an ortho-directing catalyst (a catalyst that promotes the formation of o-o′ methylene linkages in the phenol-formaldehyde condensation reaction). The total number of moles of formaldehyde added in the first and second steps of the reaction must be less than the total number of moles of phenol in order to produce the hybrid novolac resin. The ortho-directing catalyst can be any of a variety selected from acid salts of electropositive bivalent metals. Suitable ortho-directing catalysts include zinc, manganese, magnesium, cadmium and cobalt metal ions.

The resulting mixture of intermediate resin, additional formaldehyde and the ortho-directing catalyst is preferably heated to reflux conditions (about 100° C.) until a major portion of the additional formaldehyde reacts with the remaining unreacted phenol. The resulting mixture is then distilled under atmospheric pressure until the boiling temperature rises to the range of from 115° C. to 150° C., and preferably from 125° C. to 150° C. The mixture is then held at reflux conditions at a temperature in the range of from 110° C. to 145° C. until the condensation reaction is complete. For present purposes, the reaction is complete when there is no increase in molecular weight of the product as determined by standard test methods. The resulting product is the hybrid resin, which can be dissolved in a conventional organic solvent with water to form a liquid hybrid resin. Alternatively the resulting product can be distilled to remove residual monomer and water and then cooled to form a solid hybrid resin. In addition, conventional additives such as lubricants or aryl acids can be combined with the hybrid resin without detrimentally affecting its novel and unexpected characteristics.

The foregoing procedure can be modified in several ways, while still yielding the hybrid resin of the present invention. For example, in the first step of the reaction, the phenol and formaldehyde can be present in the desired molar ratio of the final product. The first step of the reaction is then terminated by cooling the reactants and adjusting the pH to the ranges described above when only a portion of the formaldehyde has reacted with the phenol. After the pH is adjusted, the ortho-directing catalyst is added and the second step of the reaction is initiated without the addition of phenol or formaldehyde. Alternatively, formaldehyde can be initially reacted with phenol in molar ratios of 0.6:1 to 0.85:1 formaldehyde to phenol and the first step of the reaction allowed to run to completion to form the intermediate resin. After the pH of the intermediate resin is adjusted to the ranges described above, additional phenol and formaldehyde can be combined with the intermediate resin, after which the second step of the reaction can be initiated.

To produce a hybrid resin that has the requisite distribution of methylene linkages as defined above, the reactants, phenol and formaldehyde, must be reacted in the two steps of the reaction with defined limits. If $x$ is the number of moles of phenol initially reacted in the first step, $y$ is the number of moles of formaldehyde reacted in the first step, $w$ the number of additional moles of phenol reacted in the second step, and $z$ the number of additional moles of formaldehyde reacted in the second step, then if $x > y$, $w > z$, and $(w+x) > (y+z)$, the fast curing, hybrid novolac resin of the invention will be produced by any of the foregoing alternatives. In accordance with the preferred procedure to effect the two step condensation reaction first outlined in detail above, the ratio of $y:z$ can be in the range of from 10:1 to 0.05:1, preferably from 5:1 to 0.2:1, and most preferably a 1:1 ratio; the ratio of $(w+x):(y+z)$ can be in the range of from 1.3:1 to 2.5:1, and preferably from 1.3:1 to 1.7:1;

and the ratio of x:y can be in the range of from 1.05:1 to 2:1.

Fast curing shell molding compositions are produced in accordance with the present invention by coating refractory granules with from about 1% to about 9% (and preferably from about 2% to about 6%) by weight of the fast curing blended or hybrid resin. The foregoing weight percentages are based on the total combined weight of the granules and resin. In addition, a curing agent such as hexamethylenetetramine ("hexa") must be added in an amount ranging from 2% by weight to 40% by weight and preferably from about 10% by weight to about 20% by weight based on the amount of resin added. The hexa, when heated with the resin, provides the additional formaldehyde to cross link the resin. Any suitable refractory granule such as silica sand, zircon sand and lake and bank sand can be employed to formulate the shell molding composition of the present invention. Such sands of course must meet the conventional requirements of shell molding techniques.

The fast curing shell molding composition of the present invention can be produced in any of a variety of conventional ways, including combining the fast curing resin in flake form with hot sand in a muller and mulling until the resin is uniformly coated over all of the particles. Similarly, the fast curing resin can be liquified with a solvent and mixed in liquid form with the hot sand. The fast curing resin can also be mixed with sand in a combination of flake and liquid form. Alternatively, the fast curing resin of the present invention can be combined in liquid form with cold sand in the presence of a warm airstream to dry the resin while the sand and resin mixture is being mulled.

EXAMPLES

The following Examples are intended to illustrate to one of ordinary skill in the art how to make and use the invention. They are not intended in any manner to delimit the invention, but are intended as representative procedures for preparing and testing the blended and hybrid, fast curing, novolac resins and fast curing shell molding compositions of the present invention.

The general procedures set forth in the ensuing Examples first entail the preparation of a conventional control resin and a prior art high ortho resin. Thereafter, blended and hybrid resin are prepared. The procedures for reacting phenol and formaldehyde to produce the high ortho resin and the hybrid resins are set forth. Commercially available novolac resins are employed as the conventional resins. Shell molding compositions are then prepared and the hot and cold tensile strengths and cure times of the resulting shell molding compositions are tested and compared.

In accordance with test procedure, a control shell molding composition is prepared by combining a conventional novolac resin with sand. A "test" shell molding composition is also prepared by combining a "test" resin with sand at the same resin loading as the control. "Resin loading" is the percentage of resin relative to the total sand and resin in the shell molding composition. for purposes of comparison, a "test" shell molding composition prepared from a prior art high ortho resin is first compared with the control composition. Thereafter, "test" shell molding compositions prepared from the hybrid and blended fast curing resins of the present invention are compared with the control.

A Beardsley and Piper lab speedmuller is used to mull the sand and resin to produce a uniform coating of resin over the sand. The sand is first weighed into shallow pans and placed into an oven heated to 200° C. The sand is left in the oven until the sand is uniformly heated to about 200° C. The muller is preheated with a heat gun while the sand is heating in the oven. Normally a minimum of 2 hours should be allowed for heating the sand and the muller. When the sand is heated to approximately 200° C., a pan of hot sand is poured into the muller and mulled for 1 minute for further preheat the muller. The sand used for preheating is then removed from the muller and the muller is cleaned. One pan of sand to be coated is then placed in the muller. The sand is cooled to the desired temperature for coating, usually 160° C. The resin is then added and the resin and sand are wet mulled for a minimum of time of about 1 minute. At the end of the wet mull, the hexa/water accelerator solution is added to the muller while the muller is running. The muller is then run until approximately 1 minute past the mull break. The "mull break" is that point at which the resin has been uniformly coated over the sand and no lumps or agglomerations of sand particles remain in the muller. In some cases a lubricant such as calcium stearate may be added during the mull. The coated sand is then removed from the muller, cooled and screened. The uncoated sand used for the shell molding composition tests herein has American Foundry Society numbers of from 60 to 80 mesh.

Once the sand is coated to form the shell molding composition, the melt point and hot and cold tensile strength tests are performed. A Dietert #365-A hot tensile tester is utilized as the basic tensile strength test apparatus. In addition, a Dietert #366 timer, a Dietert #363 heated shell curing accessory, Dietert #362 shell tensile pattern halves, a Dietert #400-1-motor driven universal sand strength machine and a Dietert #610-N tensile core strength accessory are employed with the basic hot tensile tester.

"Cure time" is defined as the time required for the nonheated surface of a specimen of shell molding composition to cure when placed in contact with a pattern heated to 450° F. A specimen is poured into the preheated cavity of a pattern on a Dietert hot tensile tester. The excess composition is scraped off the pattern. As soon as the specimen is in contact with the cavity, a timer such as a stop watch is activated. With the pattern open, the exposed, unheated surface of the specimen is touched at 1 second intervals with a spatula. The unheated surface will turn dark just before cure. When the surface is cured, it becomes rigid, i.e., hard and no longer tacky. As soon as the surface is cured, the timer is deactivated and the cure time recorded.

The hot tensile tests are conducted by first placing a split pattern on the lower heater block of the Dietert tensile tester. The upper block is lowered and the tester energized. The controller on the tensile tester is set at the desired curing temperature. The temperature of the patterns is allowed to stabilize for at least an hour before the test procedures begin. When the temperature of the pattern halves is stabilized, the lower block is cleaned to remove any loose sand grains. The #366 timer is then coupled to the tester. A suitable stop watch can be utilized instead of the timer. The hopper strikeoff assembly of the tester is filled with shell molding composition (coated sand) so that the mix in the pocket is level with the ends. The strikeoff edge of the hopper assembly is rested against the edge of the cavity in the pattern. The sand is then dumped into the cavity in one swift motion. Excess sand is removed from the pattern with the strikeoff edge. Thereafter the upper heater block is immediately swung down to the curing position. The timer is then activated. At the end of the desired curing time, the #366 timer will automatically energize the loading mechanism. If the #366 timer is not utilized, the test start button on the tester must be pushed. The motor of the loading mechanism will exert a pulling force on the left hand patern half, applying a load using a calibrated pendulum weight. The load applied is indicated in pounds per square inch on the dial on the tester. When the specimen breaks, the motor will reverse. The tensile strength is then read directly from the dial in pounds per square inch. Thereafter, the broken tensile specimen is removed from the tester and the tester pattern halves cleaned. Typically, a one minute curing time, two minute curing time and/or a four minute curing time are utilized for the test purposes.

For the cold tensile test, the #363 heated shell curing accessory is employed. The heater in the accessory is energized and the temperature of the accessory allowed to stabilize at about 450° F. #362 shell tensile patern halves are then placed between the guides of the lower heated block on the accessory and against the end stop plate. The strikeoff assembly is then filled with coated sand and the sand poured into the mold cavities. Excess material is struck from the mold cavities as quickly as possible. The upper block is then placed on the top of the assembly and the shell molding composition is allowed to cure for the desired curing time (for purposes of these Examples, two minutes). When the cure time has elapsed, the specimens are removed from the curing assembly and allowed to cool, usually for a minimum of two hours. After the specimens are cooled, they are tested for breaking strength utilizing a 400-1 motor driven universal sand strength machine and a #610-N tensile core strength accessory.

EXAMPLE I

A conventional liquid resin commercially available from Pacific Resins & Chemicals, Inc., Tacoma, Washington, under the tradename AMRES 1601 is utilized as the conventional resin in this Example. The distribution of methylene linkages in the AMRES 1601 resin is approximately 10% o-o', 45% p-p' and 45% o-p'. The AMRES 1601 resin contains 75% by weight solids.

A high ortho liquid novolac resin is prepared by adding 2404.9 grams (25.56 moles) of phenol, 914.5 grams (15.24 moles) of 50% aqueous formaldehyde, and 3.0 grams (0.0137 moles) of zinc acetate duohydrate to a four liter resin reactor equipped with heating, cooling, reflux and distillation capabilities. The zinc acetate duohydrate is an ortho directing catalyst. The pH of the resulting mixture is adjusted to the range of about 5.0 to about 5.5. The mixture is thereafter refluxed at a product temperature of about 100° C. for 215 minutes. The mixture is then distilled under atmospheric pressure until a temperature of 145° C. is achieved. Vacuum distillation should not be used at this stage. Thereafter, the mixture is refluxed at a product temperature between 145° C. and 120° C. for about 2 hours, with the addition of heat to maintain reflux if necessary. Atmospheric distillation is then resumed until a product temperature of about 145° C. is attained. The distillation is then stopped and the product is allowed to reflux again for an additional 1 hour at the foregoing temperature, again with the addition of heat, if necessary. After the 1 hour reflux period, the product is distilled until a free phenol content of about 14.8% to about 15.2% by weight based on the total solids present is attained. The resin is then cooled to about 120° C. 132.65 grams of water are then added and mixed thoroughly with the resin; thereafter, 178.5 grams of methanol is added to the warm resin and mixed thoroughly. Enough salicylic acid is added to the mixture to bring the salicylic acid content up to 2% by weight of the total solids. The resulting liquid resin has a solids content of about 75% by weight and consists of about 63% o-o' methylene linkages and about 37% o-p' methylene linkages.

A blended resin of the present invention is prepared by mixing the AMRES 1601 resin with the high ortho resin just prepared on 1:1 solids basis, that is, so that the blended resin contains 50% solids from the high ortho resin and 50% solids from the AMRES 1601 resin.

In accordance with the above-described procedure for preparing a shell molding composition utilizing a liquid novolac resin, 200.2 grams of the AMRES 1601 conventional resin (147.375 grams solids), 8 grams of calcium stearate (a lubricant), 22.8 grams of hexa, and 80 grams of water are combined with the sand in the muller to form a conventional shell molding composition. Similarly, 195.7 grams (147.375 grams solids) of the high ortho resin, 8 grams of calcium stearate, 22.8 grams hexa and 80 grams of wter are combined with sand in the muller to produce a high ortho shell molding composition. The blended resin prepared above is utilized to produce the fast curing shell molding composition of the present invention by combining 197.0 grams of the blended resin (147.375 grams solids), 8.0 grams calcium stearate, 22.8 grams hexa, and 80 grams of water with sand in the muller. Each of the above liquid mixes is combined in the muller with 6,810 grams of silica sand at a temperature of 160° C. in accordance with the procedures outlined above. Each of the shell molding compositions have a resin loading of approximately 2.5% by weight.

One minute and four minute hot tensile tests, two minute cold tensile tests, and a cure time test are run in accordance with the above procedures. The results are set forth in TABLE I. Each of the hot tensile and cure time tests is repeated three times and the results averaged. The cold tensile test is repeated six times and the results averaged.

TABLE I

| Shell Molding Composition Prepared With | Hot Tensile (psi) 1 min. | 4 min. | Cold Tensile (psi) 2 min. | Cure Time (sec.) |
|---|---|---|---|---|
| Conventional Resin | 123 | 343 | 378 | 77.1 |
| High Ortho Resin | 114 | 221 | 278 | 65.8 |
| Blended Resin | 120 | 339 | 387 | 66.5 |

As can be seen, the blended resin provides hot tensile and cold tensile strengths that are very near those of the conventional shell molding resin, while the cure time of the shell molding resin of the present invention is substantially less than the cure time of the conventional resin and very similar to that of the high ortho resin.

EXAMPLE II

A hybrid resin is prepared in accordance with the present invention by adding to a four liter resin reactor equipped as in Example I 2515.0 grams (26.727 moles) phenol, 402.0 grams of 50% aqueous formaldehyde (6.693 moles of formaldehyde) and 9.45 grams of 50% aqueous sulphuric acid. The materials are heated to 70°

C. and held at that temperature for 180 minutes, cooling the reactor to maintain the temperature at 70° C. The materials are then heated to and held at reflux under reflux conditions for about 30 minutes. The mixture is then cooled to 60° C. and 3.85 grams of 94% calcium hydroxide, 562 grams (9.407 moles) of 50% aqueous formaldehyde, and 5.0 grams of zinc acetate duohydrate are added. The pH is thereby adjusted to the range of 5.0 to 6.0. The resulting mixture is then refluxed for about 150 minutes, followed by atmospheric distillation until the temperature of the mixture reaches 145° C. Vacuum distillation should not be used at this stage. The mixture is then refluxed between a temperature of 120° C. and 145° C. for about 120 minutes, with the addition of heat, if necessary. The mixture is again atmospherically distilled to a temperature of 145° C., and subsequently refluxed for 60 minutes. The mixture is then vacuum distilled to a melt viscosity of about 600–750 c.p.s. at 150° C. Thereafter, the resin is cooled to 135° C. and 4% by weight calcium stearate based on the resin yield is added and mixed until homogeneous. Thereafter, 2% by weight salicylic acid based on the resin yield is added and the resulting mixture stirred until homogeneous. The product is then poured from the reactor, cooled and broken into flakes.

In accordance with the procedures outlined above, 226 grams of a conventional novolac resin (available under the tradename CD-5Q from Pacific Resins and Chemicals, Inc. in Tacoma, Washington, and having a methylene linkage distribution substantially identical to the conventional resin utilized in Example I), 32.2 grams of hexa, and 80.0 grams of water are added to 6,810 grams of silica sand. The mixture is then mulled to produce the shell molding composition. Similarly, a fast curing shell molding composition is prepared from the hybrid resin by adding 226 grams of resin, 32.2 grams hexa and 80.0 grams of water to 6,810 grams of silica sand. The shell molding compositions in both cases have a resin loading of about 3.5%. The sand temperature was 160° C.

Hot tensile, cold tensile, and cure time tests are then run on each of the resulting shell molding compositions. The one minute and 2 minute hot tensile tests and the cure time test are repeated three times and the results averaged. The 2 minute cold tensile test is repeated six times and the results averaged. The results are set forth in TABLE II below. As can be seen by reviewing the test results, the hot tensile, cold tensile and melt point values of the fast curing shell molding composition of the present invention are very near those of the conventional shell molding composition, while the cure time of the fast curing shell molding composition of the present invention is substantially less than that of the conventional resin.

TABLE II

|  | Hot Tensile (psi) 1 min. | 2 min. | Cold Tensile (psi) 2 min. | Cure Time (sec.) |
|---|---|---|---|---|
| Conventional Resin | 150 | 305 | 467 | 72.9 |
| Hybrid Resin | 147 | 263 | 418 | 65.0 |

EXAMPLE III

A high ortho resin is prepared in accordance with the procedure set forth in Example I. After excess phenol is removed from the liquid resin, the resin is poured from the reactor vessel, cooled and broken into flakes. The resulting flaked resin contains about 67% o-o' linkages and about 33% o-p' linkages. A plurality of samples of a blended resin of the present invention are then prepared by mixing the high ortho resin flakes with conventional resin flakes. Each of the samples contain different ratios of high ortho and conventional resins to yield a plurality of samples having differing percentages of o-o' methylene linkages as set forth in TABLE III below. The conventional resin employed is available from Pacific Resins and Chemicals of Tacoma, Washington under the trade designation "S-1575-A." The conventional resin contains about 10% o-o' linkages, about 45% l-p' linkages and about 45% p-p' linkages.

Shell molding compositions are then formed and cured in accordance with the procedures set forth in Example I. The cure times are recorded in TABLE III below. Additionally, shell molding compositions are prepared from four samples of the conventional resin and are cured. The cure times for the conventional resin compositions are averaged and set forth in TABLE III. In addition to the data set forth in TABLE III, it is observed that all blended resins in accordance with the present invention containing more than 23.5% o-o' methylene linkages have cure times ranging between about 59 and about 63 seconds.

TABLE III

| Resin | Percentage of o-o' Methylene Linkages | Cure Time (sec.) |
|---|---|---|
| Conventional | 10. | 68.7 |
| Blended-A | 15.7 | 67.4 |
| Blended-B | 18.5 | 66.0 |
| Blended-C | 21.4 | 63.8 |
| Blended-D | 24.2 | 63.1 |

It can be observed from the data set forth in TABLE III that a significant decrease in cure time occurs when the total number of o-o' linkages reaches or exceeds about 21%. When the data set forth in TABLE III is graphically depicted as cure time versus percentage of o-o' linkages, an inflection point is observed at about 19% o-o' linkages. This inflection point has been chosen as the lower limit for the number of o-o' linkages that are required for the high curing speed resin of the present invention.

The present invention has been described in relation to its preferred embodiments. One of ordinary skill, after reading the foregoing specification, will be able to effect various changes and substitutions of equivalents without departing from the broad concepts disclosed hereon. It is therefore intended that the protection afforded by Letters Patent granted hereon be limited only by the definition contained in the appended claims and equivalents thereof.

The embodiments of the invention in which an exclusive property or privilege is being claimed are defined as follows:

1. A method for producing a fast curing novolac resin for use in coating refractory granules comprising the steps of:
   (a) initially reacting x moles of phenol with y moles of formaldehyde in the presence of an acid catalyst to form an intermediate resin,
   (b) adjusting the pH of the intermediate resin to within the range of about 3.0 to about 7.0,
   (c) thereafter reacting w moles of phenol with z moles of formaldehyde in the presence of said intermediate resin and in the presence of an ortho-directing catalyst to produce a hybrid, fast curing resin, wherein $x>y$, $w>z$, and $(x+w)>(y+z)$.

2. The hybrid resin produced by the method of claim 1.

3. The method of claim 1 wherein said hybrid resin is a methylene chained polyphenylol wherein at least about 50% of the total number of methylene linkages are o-o' and p-p', wherein at least 19% of the total number of methylene linkages are o-o' and wherein at least 3% of the total number of methylene linkages are p-p'.

4. The hybrid resin produced by the method of claim 3.

5. The method of claim 1 wherein the ratio of x:y is in the range of from 1.05:1 to 2:1.

6. The hybrid resin produced by the method of claim 5.

7. The method of claim 1 wherein the ratio of y:z is in the range of from 10:1 to 0.05:1.

8. The hybrid resin produced by the method of claim 7.

9. The method of claim 1 wherein the ratio of $(x+w):(y+z)$ is in the range of from 1.3:1 to 2.5:1.

10. The resin produced by the method of claim 9.

11. The method of claim 1 wherein said acid catalyst is selected from the group consisting of sulphuric acid, oxalic acid, salicylic acid, hydrochloric acid, phosphoric acid, and p-toluene sulphonic acid.

12. The resin produced by the method of claim 11.

13. The method of claim 1 wherein said ortho-directing catalyst is selected from salts of electropositive bivalent metal ions.

14. The resin produced by the method of claim 13.

15. The method of claim 13 wherein said metal ions are selected from the group consisting of manganese, zinc, cadmium, magnesium and cobalt.

16. The resin produced by the method of claim 15.

* * * * *

UNITED STATES PATENT AND TRADEMARK OFFICE
CERTIFICATE OF CORRECTION

Page 1 of 2

PATENT NO. : 4,403,076
DATED : September 6, 1983
INVENTOR(S) : Roderick A. McDonald It is certified that error appears in the above-identified patent and that said Letters Patent is hereby corrected as shown below:

| | |
|---|---|
| Column 2, | line 54, "shall" should be --shell-- |
| Column 3, | line 2, "no" should be --not-- |
| Column 4, | line 41, "fall" should be --falls-- |
| Column 4, | line 42, insert --,-- after "example" |
| Column 4, | line 43, "are" should be --is-- |
| Column 4, | line 51, insert --of-- after "amount" |
| Column 4, | line 52, delete --,-- after "formaldehyde" |
| Column 6, | line 46, "resin" should be --resins-- |
| Column 7, | line 61, "for" should be --For-- |
| Column 7, | line 13, "45% l-p" should be --45% o-p-- |
| Column 12, | |
| Cover Page: | |
| In the Abstract, | line 8, "portions" should be --positions-- |

UNITED STATES PATENT AND TRADEMARK OFFICE
CERTIFICATE OF CORRECTION

PATENT NO. : 4,403,076

DATED : September 6, 1983

INVENTOR(S) : Roderick A. McDonald

It is certified that error appears in the above-identified patent and that said Letters Patent is hereby corrected as shown below:

In the Assignee Designation "Pacific Resins & Chemicals, Inc. Tacoma, Washington" should read -- Georgia-Pacific Corporation --. Atlanta, Georgia Signed and Sealed this Thirteenth Day of March 1984

[SEAL]

Attest:

GERALD J. MOSSINGHOFF

Attesting Officer

Commissioner of Patents and Trademarks